3,813,387
SULPHAMOYLPHENYL PYRROLIDINONES
Rolf Wilheim Pfirrmann, Lucerne, and Emil Hofstetter, Wolhusen, Switzerland, assignors to Ed. Geistlich Sohne A.G. fur Chemische Industrie
No Drawing. Filed Aug. 4, 1971, Ser. No. 169,062
Claims priority, application Great Britain, Aug. 5, 1970, 37,842/70
Int. Cl. C07d 27/08
U.S. Cl. 260—239.6                 10 Claims

ABSTRACT OF THE DISCLOSURE

New antiepileptic compounds showing effectiveness against both grand mal and petit mal forms of epilepsy coupled with very low toxicities and good in vivo stability have the 1-(sulphamoylaryl)-pyrrolidin-2-one structure; the pyrrolidine ring carrying as possible substituents aliphatic, cycloaliphatic, cycloalkylidene araliphatic and aryl groups; the sulphamoylaryl portion carrying as possible substituents halogen atoms or aliphatic hydrocarbon, trifluoromethyl, ether, hydroxy or acylamino groups. The compounds are prepared by reaction of a sulphamoylarylamine with a butyrolactone or γ-halobutyryl halide or by halosulphonation of a corresponding 1-arylpyrrolidin-2-one and reaction with ammonia or an amine.

---

This invention relates to novel compounds of use in the treatment of epilepsy and to processes for their preparation.

In general, the majority of the available antiepileptic drugs are active against either grand mal or petit mal epilepsy but not against both forms. We have now found that novel sulphamoylphenyl pyrrolidinones have shown good activity in both the electroshock and cardiazole-shock tests, indicative of activity against both grand and petit mal forms of epilepsy.

According to the present invention we provide compounds of the general formula

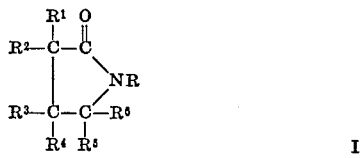

where $R^1$, $R^2$, $R^3$, $R^4$, $R^5$ and $R^6$ which may be the same or different are hydrogen atoms, aliphatic groups, cycloaliphatic groups, araliphatic groups or aryl groups or $R^1$ and $R^2$, $R^3$ and $R^4$ or $R^5$ and $R^6$ may together represent a cycloalkylidene group; and R is an aryl group carrying at least one sulphamoyl group and their salts with bases.

R is preferably a sulphamoylphenyl group which may, for example, have the formula

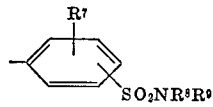

where $R^7$ represents one or more hydrogen or halogen atoms, or aliphatic hydrocarbon, trifluoromethyl ether, hydroxy or acylamino groups; and $R^8$ and $R^9$, which may be the same or different, are hydrogen atoms, heterocyclic groups, such as pyridyl, pyrimidyl or imidazolyl groups, or aliphatic hydrocarbon groups which may, if desired, carry substituents such as oxo, hydroxyl, carboxyl or esterified carboxyl, or amino or alkylamino groups, or together with the nitrogen atom to which they are attached, form a heterocyclic group, e.g. a piperidyl or piperazyl group; and their salts with bases.

$R^7$ is preferably a halogen atom such as bromine, or more preferably fluorine or most advantageously chlorine. Compounds in which the sulphamoyl group $SO_2NR^8R^9$ is in the 4-position are especially preferred for their good anti-convulsant activity, especially those in which $R^5$ is a chlorine or fluorine atom.

$R^8$ and $R^9$ may, for example, be alkyl groups having 1–5 carbon atoms, i.e. methyl, ethyl, propyl, butyl or amyl groups, acyl groups such as acetyl or benzoyl groups, alkoxy carbonyl groups such as ethoxy carbonyl groups, carbamyl groups e.g. the n-butylaminocarbonyl group, hydroxyalkyl groups, e.g. β-hydroxyethyl, or esterified carboxyalkyl groups e.g. ethoxycarbonylethyl groups. The preferred compounds, however, are those in which $R^8$ and $R^9$ are both hydrogen.

Where any of $R^1$, $R^2$, $R^3$, $R^4$, $R^5$ and $R^6$ are aliphatic groups they are preferably alkyl or alkenyl groups, advantageously having 1–8 carbon atoms, most preferably 1–5 carbon atoms, for example, methyl, ethyl, propyl, butyl, amyl, hexyl, heptyl or allyl groups which may carry substituents such as aryl groups, for example phenyl groups, which may be substituted as described below. Such groups may thus include benzyl, phenethyl and phenylallyl groups. One or more of $R^1$, $R^2$, $R^3$, $R^4$, $R^5$ and $R^6$ may be a cycloaliphatic group, for example a cycloalkyl or cycloalkenyl, or two adjacent groups, i.e. $R^1$ and $R^2$, $R^3$ and $R^4$, or $R^5$ and $R^6$ may constitute together a cycloalkylidene group such as a cyclopentylidene or cyclohexylidene group. Cycloalkyl groups may, for example, include cyclopentyl and cyclohexyl groups which cycloalkenyl groups may, for example, include cyclopentenyl and cyclohexenyl groups in which the double bond is in any of the available positions. Such groups in general preferably contain 3–8 carbon atoms, advantageously 4–7 carbon atoms.

Where one or more of $R^1$, $R^2$, $R^3$, $R^4$, $R^5$ and $R^6$ is aryl, or araliphatic, this may carry one or more alkoxy, methylene dioxy, nitro, cyano, acyl, carboxyl, esterified carboxyl, amino, alkylamino, sulphonamide or acylamido groups or halogen atoms. The phenyl or chlorophenyl group is preferred.

One pair of substituents $R^1$ and $R^2$, or $R^3$ and $R^4$ or $R^5$ and $R^6$ may advantageously be methyl groups or alternatively one of the substituents may advantageously be a phenyl group, while the remainder are preferably all hydrogen atoms. $R^3$ is also advantageously a methyl group while $R^4$ is a phenyl group and the remainder are hydrogen atoms.

The new compounds form salts with bases, for example alkali metal salts e.g. sodium salts or salts with ammonia or amines.

As mentioned above, the compounds according to the present invention show interesting activity against both grand mal and petit mal forms of epilepsy. This activity is indicated respectively by the electro shock test and the Cardiazol shock test. Activity and toxicity for two particularly noteworthy compounds as compared with the available drug α-ethyl-α-methylsuccinimide (C) are shown in the following table. The compounds are A, 1-(p-Sulphamoylphenyl) - 4-methyl-4-phenylpyrrolidin-2-one and B, 1-(2 - chloro-4-sulphamoylphenyl)-4-phenylpyrrolidin-2-one, the products of Examples 15 and 17 respectively.

| Compound | Toxicity $LD_{50}$, mg./kg. | Electro shock $ED_{50}$ | | Cardiazol shock, mouse |
|---|---|---|---|---|
| | | Mouse | rat | |
| A | About 4,000 | 10–7.5 | | 50 |
| B | Over 7,000 | 2.5 | 2.5 | 100 |
| C | About 1,500 | 500 | | 200–300 |

It will also be noted that the ratio of $ED_{50}/LD_{50}$ is significantly better for the compounds according to the invention.

The compound showed no sedative activity up to 500 mg./kg., and furthermore showed a better stability *in vivo* than available succinimide anti-epileptic drugs.

Other compounds according to the invention have similar properties; the particularly preferred products include:

1-(*p*-sulphamoylphenyl)-3,3-dimethyl-pyrrolidin-2-one,
1-(*p*-sulphamoylphenyl)-4,4-dimethyl-pyrrolidin-2-one,
1-(*p*-sulphamoylphenyl)-5,5-dimethyl-pyrrolidin-2-one,
1-(*p*-sulphamoylphenyl)-4,4,5-trimethyl-pyrrolidin-2-one,
1-(*p*-sulphamoylphenyl)-3,3,5-trimethyl-pyrrolidin-2-one,
1-(*p*-sulphamoylphenyl)-4-methyl-4-ethyl-pyrrolidin-2-one,
1-(*p*-sulphamoylphenyl)-3-phenyl-pyrrolidin-2-one,
1-(2-chloro-4-sulphamoylphenyl)-3-phenyl-pyrrolidin-2-one,
1-(*p*-sulphamoylphenyl)-4-phenyl-pyrrolidin-2-one, and
1-(*p*-sulphamoylphenyl)-5-phenyl-pyrrolidin-2-one.

According to a further feature of the invention we provide pharmaceutical compositions containing one or more compounds according to the invention together with one or more pharmaceutical carriers or excipients.

Thus, for example, the compositions may take the form of tablets, coated tablets, capsules, lozenges, suppositories, ampoules for injection, solutions, etc.

The carriers or excipients in such compositions may, for example be those conventional for such forms and may include starch, lactose, magnesium stearate, talc, gelatin, sterile pyrogen-free water, or suspending, emulsifying, dispersing, thickening or flavouring agents.

Dosage units forms such as tablets, capsules, suppositories or ampoules are preferred and advantageously each unit contains 10 to 1000 mg. of active substances, preferably 100 to 300 mg.

The compositions, preferably contain the active substance at a concentration from 0.10 to 80.0% by weight.

According to a still further feature of the invention we provide a process for the preparation of compounds of the general formula I as defined above wherein a compound of the general formula $RNH_2$, preferably a compound of the formula:

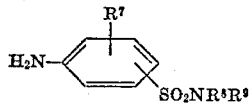

II (where $R^7$, $R^8$ and $R^9$ are as defined above) is reacted with a butyrolactone of the general formula

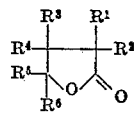

III (where $R^1$, $R^2$, $R^3$, $R^4$, $R^5$ and $R^6$ are as defined for formula I above) at an elevated temperature in the presence of a dehydration catalyst such as zinc chloride or aluminum chloride. The reaction is conveniently effected in the absence of a solvent at elevated temperature e.g. in an autoclave at a temperature of from 150° to 300° C. e.g. about 240° C.

According to an alternative process according to the present invention, the compound $RNH_2$ is reacted with a butyric acid derivative of the general formula:

$$XCR^5R^6.CR^3R^4.CR^1R^2.COX \quad IV$$

(where $R^1$, $R^2$, $R^3$, $R^4$, $R^5$ and $R^6$ are as defined above and X is a halogen atom preferably bromine). The reaction is preferably effected in a cyclic ether solvent such as dioxan or tetrahydrofuran, advantageously at an elevated temperature, e.g. from 75 to 150° C., for example about 100° C.

The reaction with the compound of formula IV may be effected in a single stage, or in two stages. In the latter case the product of the first stage, which is accomplished simply by heating, will have the general formula:

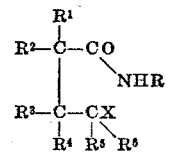

V (where $R^1$, $R^2$, $R^3$, $R^4$, $R^5$ and $R^6$ and X are as defined above) and the final condensation proceeds by ring-closure of this compound by elimination of HX preferably in the presence of a base, for example an alkali metal amide or hydride e.g. sodamide, in a cyclic ether solvent such as dioxan or tetrahydrofuran. The intermediate V is preferably isolated from the initial starting materials and the product of formula I before being cyclized.

The dihalogeno compound of the formula IV may be prepared by the reaction of a lactone of the formula III with a halogenating agent, e.g. a phosphorus pentahalide such as phosphorus pentabromide or phosphorus pentachloride, conveniently at an elevated temperature, for example 75°–150° C. e.g. 90–100° C.

The pyrrolidinone compounds according to the invention may also be prepared from corresponding compounds lacking a sulphamoyl group by reaction with reagents for introducing a sulphamoyl group. Thus, for example, a compound of formula

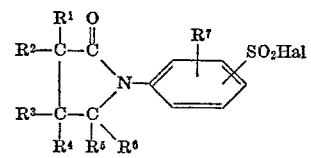

VI (where $R^1$, $R^2$, $R^3$, $R^4$, $R^5$, $R^6$ and $R^7$ are as defined above and Hal is a halogen atom, e.g. chlorine) may be reacted with ammonia or an amine of the formula $NH—R^8R^9$, where $R^8$ and $R^9$ have the above meanings. The group $SO_2Hal$ can be introduced by reaction of a compound of the formula

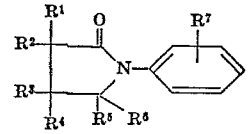

VII (where $R^1$, $R^2$, $R^3$, $R^4$, $R^5$, $R^6$ and $R^7$ have the above meanings) with a halosulphonic acid, e.g. chlorosulphonic acid.

It is also possible to prepare a compound of formula VI by diazotization of an amine of the general formula

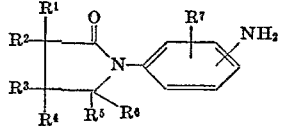

VIII (where $R^1$, $R^2$, $R^3$, $R^4$, $R^5$, $R^6$ and $R^7$ are as defined for formula I) and treatment with sulphur dioxide in the presence of a cuprous halide. The amine of formula VIII can be prepared by reduction of the corresponding nitro compound, which nitro compound may be prepared by reacting a nitroaniline with a compound of formula III or IV in a process analogous to that described earlier, or by nitration of a compound of formula VII. It will be understood that in a sulphonation or nitration reaction any other aryl groups present in the molecule, e.g. on the pyrrolidinone ring, can also be sulphonated or nitrated.

The compounds of formula I in which one or both of $R^8$ and $R^9$ are hydrogen can be used to prepare derivatives thereof. Thus, for example, acylation gives the acyl derivatives, e.g. by reaction with an acyl halide or anhydride; alkylation gives the alkyl derivatives, e.g. by reaction with an alkyl halide, sulphate, sulphonate, etc. Hydroxyalkylation gives the hydroxyalkyl derivative, e.g. by reaction with ethylene oxide; carbamylation gives the corresponding urethane, e.g. by reaction with a carbonyl dihalide followed by reaction with ammonia or an amine. Urethane derivatives can be prepared, for example, by reaction with a haloformic acid ester, e.g. a chloroformic acid ester, preferably an alkyl ester having 1–5 carbon atoms in the alkyl group. Saturated substituents $R^1$, $R^2$, $R^3$, $R^4$, $R^5$ or $R^6$ can be prepared from corresponding unsaturated substituents and thus, for example, an $n$-propyl substituent can be prepared from an allyl substituent or a cycloalkyl substituent from a cycloalkenyl substituent by reduction, e.g. catalytic hydrogenation, for example, using a platinum catalyst.

In order that the invention may be well understood we give the following examples by way of illustration only (all temperatures are in ° C.).

The starting materials used in the examples may be prepared by the methods disclosed in the following publications:

| Example | Literature |
|---|---|
| 4 | J. Chem. Soc. *1949*, 2745. |
| 8+11 | J. Am. Soc. *73*, 448 (1951). |
| 12 | J. Am. Soc. *69*, 11 (1947). |
| 12 | Blst. *17*, 319. |

EXAMPLE 1

1-(p-sulphamoylphenyl)-pyrrolidin-2-one 1-phenylpyrrolidin-2-one (3 g.) was mixed with chlorosulphonic acid (20 ml.) and the mixture was heated at 140–160° during 20 minutes. The mixture was then poured into ice and the precipitated acid chloride was washed, dissolved in chloroform (50 ml.) and treated with concentrated ammonia (50 ml.). The reaction mixture was heated under reflux for 15 minutes and then cooled. The precipitated material was filtered off under suction and dried, to yield 3.5 g. M.P. 236–238° C. The product was recrystallized from DMF-ether to M.P. 240–214° C.

Found: C, 50.23; H, 5.01; N, 11.53;
$C_{10}H_{12}N_2O_3S$ (240)
Requires: C, 50.00; H, 5.03; N, 11.66%

EXAMPLE 2

1-(p-sulphamoylphenyl)-3,3-dimethyl-pyrrolidin-2-one 1-phenyl-3,3-dimethylpyrrolidon-2-one (2.8 g.) was reacted with chlorosulphonic acid and the product treated with ammonia in a manner analogous to that of Example 1 to give a crude yield of 1.1 g. Recrystallization from ethyl acetate gave M.P. 210–211° C.

Found: C, 53.52; H, 5.96; N, 10.39; S, 11.98
$C_{12}H_{16}N_2O_3S$ (268.26)
Requires: C, 53.72; H, 6.01; N, 10.44; S, 11.92%

EXAMPLE 3

1-(p-sulphamoylphenyl)-4,4-dimethyl-pyrrolidin-2-one 1-phenyl-4,4-dimethylpyrrolidin-2-one (6 g.) was treated analogously to the method of Example 1 to yield the p-sulfamoyl derivative (4.8 g.) M.P. 191–193° C. (from ethylacetate).

Found: C, 53.78; H, 6.04; N, 10.42; S, 11.83
$C_{12}H_{16}N_2O_3S$ (268.26).
Requires: C, 53.72; H, 6.01; N, 10.44; S, 11.92%.

EXAMPLE 4

1-(p-sulphamoylphenyl)-4,4-dimethyl-pyrrolidin-2-one 3,3-dimethylbutyrolactone (6 g.) zinc chloride (dry) (0.2 g.) and sulfanilamide (9.1 g.) were heated together in an autoclave for 24 hours at 220–240° C. The black reaction mixture was thoroughly extracted first with dilute hydrochloric acid and then with hot ethylacetate. The ethylacetate solution was diluted with petroleum ether to yield a precipitate of the title compound (1.5 g.) which was recrystallized from ethylacetate to M.P. 191–193° C. This compound is identical with the product of Example 3.

EXAMPLE 5

1-(p-sulphamoylphenyl)-5,5-dimethyl-pyrrolidin-2-one

By a method analogous to that of Example 1, 1-phenyl-5,5-dimethylpyrrolidin-2-one (3 g.) yield a crude product (1.6 g.) which on recrystallization from ethylacetate or alcohol gave the pure product, M.P. 203–204° C.

Found: C, 53.71; H, 5.99; N, 10.35; S, 11.88
$C_{12}H_{16}N_2O_3S$ (268.26)
Requires: C, 53.72; H, 6.01; N, 10.44; S, 11.92%

EXAMPLE 6

1-(p-sulphamoylphenyl) - 4,4,5 - trimethyl - pyrrolidin-2-one (I) and 1-(p-sulphamoylphenyl)-3,3,5-trimethyl-pyrrolidin-2-one (II)

A mixture of 1-phenyl-4,4,5-trimethyl- and 1-phenyl-3,3,5-trimethyl-pyrrolidin-2-one (9 g.) was treated by a method analogous to that of Example 1 to yield a crude product (6.3 g.) which on recrystallization from ethylacetate yielded I (crude) (4.8 g.), the mother liquors containing II (crude) (ca. 1 g.) I was recrystallized from ethylacetate to M.P. 153–154° C.

Found: C, 55.30; H, 6.37; N, 9.92; S, 11.24
$C_{13}H_{18}N_2O_3S$ (282.29)
Requires: C, 55.31; H, 6.43; N, 9.92; S, 11.32%

NMR: $CH_2$ not coupled with CH, therefore I.

II was recrystallized from ethylacetate to M.P. 175–177° C.

Found: C, 55.20; H, 6.32; N, 9.80; S, 11.32
$C_{13}H_{18}N_2O_3S$ (282.29)
Requires: C, 55.31; H, 6.43; N, 9.92; S, 11.32%

NMR: $CH_2$ coupled with CH, therefore II.

EXAMPLE 7

1-(p-sulphamoylphenyl)-4-methyl-4-ethylpyrrolidin-2-one

1 - phenyl - 4-methyl-ethyl-pyrrolidin-2-one was reacted with chlorosulphonic acid and then with ammonia by the method of Example 1 to yield a crude product (6.3 g.) recrystallized from acetone-ethyl-acetate-petroleum ether to M.P. 184–186° C.

Found: C, 55.26; H, 6.53; N, 9.62;
$C_{13}H_{18}N_2O_3S$ (282.29)
Requires: C, 55.31; H, 6.43; N, 9.92%.

EXAMPLE 8

1-(p-sulphamoylphenyl)-3-phenyl-pyrrolidin-2-one 2-phenylbutyrolactone (7 g.) were reacted with zinc chloride and sulfanilamide by the method of Example 4 at 250–260° C. The reaction mixture contained much starting material together with the desired product (1 g.). Recrystallization from ethylacetate gave M.P. 198–199° C.

Found: C, 60.76; H, 5.14; N, 8.81; S, 10.10.
$C_{16}H_{16}N_2O_3$ (316.30)
Requires: C, 60.75; H, 5.10; N, 8.86; S, 10.11%

EXAMPLE 9

1-(p-sulphamoylphenyl)-3-phenyl-pyrrolidin-2-one 2 phenylbutyrolactone (17 g.) was heated with phosphorus pentabromide (70 g.) one hour at 90–100° C. and the mixture allowed to stand overnight at 20–25° C. The dark solution was distilled at 102–133° C. (0.2 nm. Hg) to yield the intermediate 2-phenyl-4-bromobutyryl bromide (28.7 g.) This intermediate was dissolved in absolute dioxan (50 ml.) and added to a solution of sulfanilamide (32.4 g.) in absolute dioxan (200 ml.). The reaction mixture was heated at 90–100° C. for one hour and the precipitated sulfanilamide hydrobromide was filtered off. The filtrate was then evaporated to dryness *in vacuo* and the residue (34 g.) was washed with warm ether to yield a residue (24 g.) of crude 2-phenyl-4-bromobutyrosulfanilamide.

The ether solution was concentrated and the residue dissolved in dilute sodium hydroxide. Addition of dilute hydrochloric acid precipitated the desired product (5.6 g.).

The 2 - phenyl - 4-bromobutyro-sulfanilamide (24 g.) was dissolved in absolute dioxan (250 ml.) and powdered sodamide (4 g.) added. The reaction mixture was heated under reflux for two hours and the precipitated matter filtered off from the dioxan solution under suction. The filtrate was evaporated to dryness *in vacuo* and the residue treated with dilute sodium hydroxide (200 ml.) to give a precipitate. The suspension was then acidified with dilute hydrochloric acid and the resulting precipitate filtered off under suction and dried to give a crude yield of 8.3 g. (plus 5.6 g.), M.P. 170–176° C. Recrystallization from alcohol gave M.P. 197–199° C. The product is identical with that of Example 8.

EXAMPLE 10

1-(p-sulphamoylphenyl)-4-methyl-4-phenyl-pyrrolidin-2-one 3-methyl-3-phenylbutyrolactone (24 g.), zinc chloride (1 g.) and sulfanilamide (24 g.) were heated in an autoclave at 230–250° C. for 13 hours in a method analogous to that of Example 4. The reaction mixture was triturated with dilute hydrochloric acid and the insoluble portion was separated and boiled with ethylacetate (800 ml.). The ethylacetate solution was filtered over active charcoal and evaporated to dryness. The residue was washed with warm ether to leave a residue (10 g.). This residue was chromatographed on silica gel with chloroform and chloroform-methanol to give product (3.1 g. crude). Recrystallization from ethyl-acetate gave M.P. 171–172° C.

Found: C, 61.71; H, 5.55; N, 8.40; S, 9.78
$C_{17}H_{18}N_2O_3S$ (330.33)
Requires: C, 61.81; H, 5.49; N, 8.48; S, 9.68%

EXAMPLE 11

1-(2-chloro-4-sulphamoylphenyl)-3-phenyl-pyrrolidin-2-one

Using the method described in Example 9, 2-phenyl-butyrolactone (17 g.) was treated with phosphorus pentabromide (70 g.) to yield the bromide (28.2 g.). This intermediate was dissolved in dioxan and reacted with 3-chloro-4-aminobenzenesulphonamide (38.4 g.) according to the method of Example 9. The crude product (11.5 g.) was obtained from the ether solution and 2-phenyl-4-bromo - N - (2-chloro-4-sulphamoylphenyl)-butyramide (26 g.), insoluble in ether, was also obtained. This byproduct was reacted with sodamide (5 g.) in dioxan as before to yield after treatment with water and hydrochloric acid further crude product (12.4 g.). Multiple recrystallization from copious ethyl acetate gave M.P. 211–213° C.

Found: C, 54.67; H, 4.30; N, 8.07; S, 9.25; Cl, 10.0
$C_{16}H_{15}ClN_2O_3S$ (350.8)
Requires: C, 54.75; H, 4.31; N, 7.98; S, 9.14; Cl, 10.1%.

EXAMPLE 12

1-(p-sulphamoylphenyl)-4-phenyl-pyrrolidin-2-one

Preparation analogous to Example 9.

8 g. of 3-phenylbutyrolactone were brominated with 35 g. of phosphorus pentabromide. The resulting 3-phenyl-4-bromobutyrobromide (14.3 g., B.P. 0.3 mm., 125 to 131° C.) was reacted in dioxan with 16.2 g. of sulphanilamide. Without isolating the 3-phenyl-4-bromo-N-(p-sulphamoylphenyl)-butyramide, the dioxan solution was mixed with 6 g. of sodamide.

The crude product (dioxan residue) was dissolved and reprecipitated (NaOH/HCl), filtered over silica gel in chloroform/acetone (7:3) and repeatedly recrystallized from alcohol. 2.1 g. of pyrrolidone was obtained, M.P. 198 to 204° C. (sintering at 186° C.)

For elementary analysis, a sample was recrystallized from ethyl acetate and alcohol; M.P. 202 to 204° C.

$C_{16}H_{16}N_2O_3S$ (316.30).—Calc.: C, 60.67; H, 5.10; N, 8.86%. Found: C, 60.79; H, 5.16; N, 8.92%.

EXAMPLE 13

Mixture of 1-phenyy-3-cyclohexyl-pyrrolidin-2-one and 1-phenyl-4-cyclohexyl-2-pyrrolidin-2-one 2 g. of a mixture of 2-cyclohexylbutyrolactone and 3-cyclohexylbutyrolactone (about 1:1 according to g.l.c.) were kept with 4.65 g. of aniline and 2.6 g. of aniline hydrochloride is a sealed vessel for 4 hours at 230 to 240° C. (oil bath). The reaction mixture was then taken up in chloroform/ether, washed with dilute hydrochloric acid and water, dried over sodium sulphate and freed from solvent again by evaporation.

3.5 g. of the residual oil were dissolved in ether/hexane and 2.5 g. of the pyrrolidone, M.P. 110 to 119° C. (sintering from 73° C.) crystallized. A sample was recrystallized from hexane; M.P. 113° C. (sintering from 73° C.).

$C_{16}H_{21}NO$ (243.35).—Calc: C, 78.96%; H, 8.70; N, 5.7%. Found: C, 78.90; H, 8.70; N, 5.70%.

EXAMPLE 14

Mixture of 1-(p-sulphamoylphenyl)-3-cyclohexyl-pyrrolidin-2-one and 1 - (p-sulphamoylphenyl)-4-cyclohexyl-pyrrolidin-2-one 5 g. of an isomer mixture of 1-phenyl-3- or 4-cyclohexyl-2-pyrrolidone and 27 ml. of chlorosulphonic acid were heated for 20 minutes at 120° C. The reaction mixture was then poured onto ice. The water-insoluble part was taken up in chloroform, separated, mixed with 50 ml. of concentrated ammonia and refluxed for 10 to 15 minutes. After cooling, the crude product was suction-filtered and dried, yield 4.6 g. Crystallization from ethyl acetate-hexane gave 4.5 g.; M.P. 180 to 186° C. (sintering from 152° C.). Recrystallization from ethyl acetate gave a sample M.P. 190 to 196° C. (sintering from 158° C.).

$C_{16}H_{22}N_2O_3S$ (322.43).—Calc.: C, 59.63; H, 6.87; N, 8.68%. Found: C, 59.58; H, 6.86; N, 8.59%.

EXAMPLE 15

1-(2-chloro-4-sulphamoylphenyl)-4-phenyl-pyrrolidin-2-one

A solution of 28.2 g. of 3-phenyl-4-bromobutyrobromide (cf. Example 12), 38.4 g. of 3-chloro-4-aminobenzenesulfonamide and 450 ml. of dioxan was refluxed for an hour. Without isolating the 3-phenyl-4-bromo-N-(2-chloro-4-sulphamoylphenyl)-butyramide, the filtered dioxan solution was mixed with 7 g. of sodamide and boiled for an hour.

The dark dioxan solution was filtered and evaporated to dryness. The residue was dissolved in dilute caustic soda solution and then acidified with hydrochloric acid. The resulting precipitate was suction-filtered, dried (14.6 g.) and dissolved in ethyl acetate. The ethyl acetate solution was filtered over silica gel and somewhat evaporated.

12.1 g. of crude product, M.P. 167 to 170° C. crystallized and were repeatedly recrystallized from ethyl acetate; M.P. 171 to 173° C.

$C_{16}H_{15}Cl-N_2O_3S$ (350.80). Calc.: C, 54.75; H, 4.31; N, 7.98%. Found: C, 54.64; H, 4.35; N, 8.05%.

EXAMPLE 16

(a) 3-phenyl-4-bromo-N-(2-chloro-4-nitrophenyl)-butyramide 29 g. of 2-chloro-4-nitroaniline were dissolved in 250 ml. of absolute ether and slowly mixed with a solution of 25.4 g. of 3-phenyl-4-bromobutyrobromide (cf. Example 12) and 50 ml. of absolute ether. A yellow precipitate was obtained. After 2 hours the refluxed mixture was cooled and suction filtered (precipitate: 2-chloro-4-nitroaniline-hydrobromide).

The ether filtrate was evaporated to 50 ml. and cooled to 0° C. 18.1 g. of crude product, M.P. 120 to 122° C. crystallized. After repeated recrystallization from ethyl acetate the compound melts at 134 to 136° C.

$C_{16}H_{14}BrClN_2O_3$ (397.5).—Calc.: C, 48.40; H, 3.30; N, 7.06%. Found: C, 48.52; H, 3.45; N, 7.02%.

(b) 4-phenyl-1-(2-chloro-4-nitrophenyl)-pyrrolidin-2-one 8.4 g. of 3-phenyl-4-bromo-N-(2-chloro-4-nitrophenyl)-butyramide were dissolved in 200 ml. of absolute dioxan, mixed with 6 g. of sodamide and refluxed for 2 hours. The cooled reaction mixture is filtered and the clear dark dioxane filtrate was evaporated to dryness *in vacuo*. The brittle brown residue was subjected to chromotography (7 g.).

Chromatography: on silica gel made up in benzene. From the fractions with benzene-chloroform (9:1 and 4:1) 5.17 g. of crude pyrrolidin-2-one were obtained and recrystallized from ethyl acetate-petroleum ether; 3.3 g., M.P. 103 to 105° C.

$C_{16}H_{13}ClN_2O_3$ (316.80.—Calc.: C, 60.62; H, 4.13; N, 8.84%. Found: C, 60.91; H, 4.20; N, 8.91%.

EXAMPLE 17

1 - (2 - chloro-4-sulphamoylphenyl)-4-phenyl-pyrrolidin-2 - one from 1-(2-chloro-4-aminophenyl)-4-phenyl-pyrrolidin-2-one 5.4 g. of 4-phenyl-1-(2-chloro-4-nitrophenyl)-pyrrolidone were dissolved in 200 ml. of alcohol and hydrogenated with platinum oxide at 20° C. at normal pressure. After the calculated quantity of hydrogen had been taken up, the catalyst was separated by filtration. The clear filtrate was evaporated to dryness *in vacuo* to give 4.8 g. of a glassy brittle substance: 1-(2-chloro-4-aminophenyl)-4-phenyl-pyrrolidin-2-one.

IR-spectrum: 3510, 3420 cm.$^{-1}$ (NH$_2$, free valency vibrations) (in CH$_2$Cl$_2$)
3080, 3060, 2990–2900 cm.$^{-1}$ (=CH, CH, CH$_2$, valency)
1697 cm.$^{-1}$ (C=O, γ-lactam)
1625 cm.$^{-1}$ (NH$_2$, deformation vibrations)
1602, 1510 cm.$^{-1}$ (C=C, ring vibrations)
1248 cm.$^{-1}$ (C—N, primary aromatic amine).

2.7 g. of crude 1-(2-chloro-4-aminophenyl)-4-phenyl-pyrrolidin-2-one were dissolved in 10 ml. of glacial acetic acid and 12 ml. of concentrated hydrochloric acid and diazotized at 0 to 5° C. with 0.9 g. of sodium nitrate dissolved in 4 ml. of water.

The diazonium solution was then added at 0° C. to a solution of 20 ml. of glacial acetic acid and 0.6 g. of copper (II) chloride which was saturated with sulphur dioxide. At the end of gas evolution 50 ml. of water were added and the corresponding sulphonic acid chloride was precipitated. This was dissolved in about 30 ml. of chloroform and mixed with 40 ml. of concentrated ammonia. The reaction mixture was then boiled for 15 minutes and evaporated to dryness. The residue was subjected to chromatography on silica gel made up in chloroform.

From the chloroform-methanol fractions (99:1 and 98:2) 1.8 g. of crude pyrrolidone were obtained. Recrystallized from ethyl acetate, the product melts at 171 to 173° C.

From melting point, mixed melting point, IR-Spectrum and thin layer chromatography, the compound is identical to the 1-(2-chloro-4-sulphamoylphenyl) - 4 - phenyl-pyrrolidin-2-one described in Example 15.

EXAMPLE 18

1-(2-fluoro-4-sulphamoylphenyl)-4-phenyl-pyrrolidin-2-one 32.4 g. of 3-phenyl-4-bromobutyrobromide (cf. Example 12) were dissolved in 50 ml. of absolute dioxan and added to a solution of 39 g. of 3-fluoro-4-amino-benzenesulfonamide and 500 ml. of dioxan. The reaction mixture was refluxed for an hour and after cooling and standing overnight was filtered. The filtrate (the dioxan solution contains (3-phenyl-4-bromo-N-(2 - fluoro - 4 - sulphamoylphenyl)-butyramide) was mixed with 8 g. of sodamide and refluxed for 30 minutes. During boiling sodium bromide was precipitated and was removed by filtration. The dioxan was distilled off and the residue was purified by dissolving in caustic soda solution and by precipitating with concentrated hydrochloric acid to give a crude yield of 11.6 g., M.P. approx. 196° C.

Repeated crystallization from ethyl acetate and acetone (with activated charcoal) gave a sample with melting point 222 to 224° C.

$C_{16}H_{15}FN_2O_3S$ (334.3)
Calc.: C, 57.53; H, 4.53; N, 8.39; F, 5.69; S, 9.60%
Found: C, 57,47; H, 4.47; N, 8.41; F, 5.52; S, 9.48%

EXAMPLE 19

1-(3-chloro-4-sulphamoylphenyl)-4-phenyl-pyrrolidin-2-one

Preparation analogous to Example 18 with 2.5 g. of 3-phenyl - 4 - bromobutyrobromide and 1.7 g. of 2-chloro-4-aminobenzenesulfonamide. The dioxan solution containing the non-isolated intermediate 3-phenyl-4-bromo-N-(3-chloro-4-sulphamoylphenyl)-butyramide was treated with 2.5 g. of sodamide as described in Example 18 to effect cyclization.

After filtration of the reaction mixture, the dioxan solution was evaporated to dryness (no residue) and the filter residue was mixed with ice/water and acidified. A precipitate was obtained in the form of 1.1 g. of crude product which was subjected to chromatography on silica gel made up with chloroform.

From the chloroform-methanol (99:1) fraction, 0.2 g. of pyrrolidone was obtained, M.P. (from ethyl acetate) 200 to 201° C.

$C_{16}H_{15}ClN_2O_3S$ (350.8)
Calc.: C, 54.74; H, 4.31; N, 7.98%
Found: C, 54.85; H, 4.36; N, 8.08%

EXAMPLE 20

(a) 4-methyl-1,4-diphenyl-pyrrolidin-2-one 3.3 g. of 3-methyl - 3 - phenylbutyrolactone, 8.8 g. of aniline and 4.7 g. of aniline hydrochloride were kept together in an autoclave for 4 hours at 180 to 190° C. After cooling, the reaction mixture was mixed with 100 ml. of dilute hydrochloric acid and the separated oil taken up in ether. The ether layer was separated, dried over sodium sulphate and evaporated. The dark oily residue was distilled to yield 1.5 g. of crude pyrrolidone, B.P., 0.1 mm., 115 to 118° C. The pyrrolidone was crystallized from ethyl acetate/petroleum ether, M.P. 59 to 60° C.

C₁₇H₁₇NO (251.31)
Calc.: C, 81.24; H, 6.82; N, 5.57%
Found: C, 81.20; H, 6.84; N, 5.41%

(b) 4-methyl-1,4-di-(sulphamoylphenyl)-pyrrolidin-2-one 2 g. of 4-methyl-1,4-diphenyl-pyrrolidin-2-one and 15 ml. of chlorosulphonic acid were heated together for 30 minutes at 160° C. After cooling, the reaction mixture was poured carefully onto ice. The precipitated sulphonic acid chloride was separated by filtration and dissolved moist (2.1 g.) in 100 ml. of chloroform. The chloroform solution was stirred well with 200 ml. of concentrated ammonia for 2 hours at 20 to 25° C. and then evaporated to dryness *in vacuo*. The residue (1.8 g.) was dissolved in dilute caustic soda solution, filtered and precipitated with concentrated hydrochloric acid. The precipitate was filtered and dried to yield 1.3 g. of crude pyrrolidone, M.P. 140 to 160° C. (sintering from 100° C.). The product was purified by filtration over silica gel with chloroform-methanol (4:1), by dissolving and precipitating (NaOH/HCl) and by recrystallizing from water; M.P. 140 to 150° C. (sintering from 120° C.).

C₁₇H₁₉N₃O₅S₂ (409.35)
Calc.: C, 49.88; H, 4.68; N, 10.27; S, 15.62%
Found: C, 49.53; H, 4.69; N, 10.14; S, 15.67%

EXAMPLE 21

1-(2-sulphamoylphenyl)-4-phenylpyrrolidin-2-one

Preparation analogous to that of Example 18 using 28.7 g. 3-phenyl-4-bromobutyryl bromide and 32.4 g. *o*-sulphanilamide. The dioxan residue was dissolved in dilute caustic soda, filtered and re-precipitated with nitric acid. The precipitate was dried and extracted with ethyl acetate. The ethyl acetate-soluble portion was then chromatographed on silica gel made up with chloroform. From the chlorofrom-methanol fraction (95:5) 3.0 g. pyrrolidone were obtained M.P. 168-171° C. (from ethyl acetate).

C₁₆H₁₆N₂O₃S (316.30)
Calc.: C, 60.75; H, 5.10; N, 8.86%
Found: C, 60.59; H, 5.12; N, 8.87%

EXAMPLE 22

1-(2-methyl-4-sulphamoylphenyl)-4-phenylpyrrolidin-2-one

Preparation analogous to that used in Example 18, using 17 g. 3-phenyl-4-bromobutyryl bromide and 20.5 g. 3-methyl-4-aminobenzene sulphonamide. The dioxan-insoluble part was, as in Example 19, added to ice and made strongly alkaline with dilute caustic soda. The mixture was filtered and acidified with nitric acid. The precipitate was dissolved in ethyl acetate filtered, dried and evaporated to yield a residue of 14 g. This residue was dissolved in chloroform and chromatographed on silica gel. From the chloroform-methanol (98:2) fraction 7 g. pyrrolidone were obtained, M.P. 160-165° C. Recrystallization from ethyl acetate raises the M.P. to 204-207° C. (sinters).

EXAMPLE 23

1-(2-chloro-4-sulphamoylphenyl)-5-phenylpyrrolidin-2-one

Preparation analogous to Example 22 from 8 g. 4-phenyl-4-bromobutyryl bromide and 10.9 g. 3-chloro-4-aminobenzene sulphonamide. The unisolated intermediate was cyclised with 4 g. sodamide. Yield 8.4 g. (crude); M.P. after purification as in Example 22 175-176° C.

We claim:
1. A compound of the formula

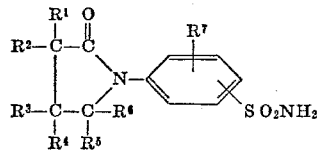

wherein
$R^1$, $R^2$, $R^3$, $R^4$, $R^5$ and $R^6$, which may be the same or different, are hydrogen, *n*-alkyl or *n*-alkenyl groups containing 1–5 carbon atoms, cycloalkyl or cycloalkenyl groups of 3–8 carbon atoms, phenylalkyl or phenylalkenyl groups with up to 8 carbon atoms in the alkyl or alkenyl portion, phenyl groups or phenyl groups substituted by halo or sulphamoyl, or $R^1$ and $R^2$, $R^3$ and $R^4$, or $R^5$ and $R^6$ may together represent a cyclo-alkylidene group of 3–8 carbon atoms, provided that at least three of $R^1$–$R^6$ are hydrogen, and $R^7$ is hydrogen, a halogen atom or a methyl group; or an alkali metal ammonia or amine salt thereof.

2. A compound as claimed in claim 1 in which each cycloalkyl, cycloalkenyl or cycloalkylidene group has 4–7 carbon atoms.

3. A compound as claimed in claim 1 in which any of $R^1$, $R^2$, $R^3$, $R^4$, $R^5$ and $R^6$ is a phenyl group substituted by halo or sulphamoyl.

4. A compound as claimed in claim 1 in which $R^7$ is a chlorine or fluorine atom.

5. A compound as claimed in claim 1 in which the group $SO_2NH_2$ is in the 4-position.

6. A compound as claimed in claim 1 in which one pair of substituents $R^1$ and $R^2$, or $R^3$ and $R^4$ or $R^5$ and $R^6$ are methyl groups; or in which one of the substituents $R^1$, $R^2$, $R^3$, $R^4$, $R^5$ and $R^6$ is a phenyl group and the remainder are all hydrogen atoms; or in which $R^3$ is a methyl group, $R^4$ is a phenyl group and $R^1$, $R^2$, $R^5$ and $R^6$ are hydrogen atoms.

7. The compound of claim 1 which is 1-(p-sulphamoylphenyl)-4-methyl-4-phenyl-pyrrolidin-2-one.

8. The compound of claim 1 which is 1-(2-chloro-4-sulphamoylphenyl)-4-phenyl-pyrrolidin-2-one.

9. The compound of claim 1 which is 1-(p-sulphamoylphenyl)-4-phenyl-pyrrolidin-2-one.

10. The compound of claim 1 which is 1-(2-fluoro-4-sulphamoylphenyl)-4-phenyl-pyrrolidin-2-one.

References Cited

UNITED STATES PATENTS 3,238,223   3/1966   Wilson et al. _____ 260—326.5

JOSEPH A. NARCAVAGE, Primary Examiner

U.S. Cl. X.R.

260—326.5 SF, 326.5 FL; 424—228, 274